US009837812B2

(12) United States Patent
Valdes et al.

(10) Patent No.: US 9,837,812 B2
(45) Date of Patent: Dec. 5, 2017

(54) POWER DISTRIBUTION SYSTEMS AND METHODS OF OPERATING POWER DISTRIBUTION SYSTEMS WITH PARTIAL DIFFERENTIAL PROTECTION

(71) Applicant: General Electric Company, Schenectady, NY (US)

(72) Inventors: Marcelo Esteban Valdes, Burlington, CT (US); Ilia Voloh, Thornhill (CA)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 14/548,529

(22) Filed: Nov. 20, 2014

(65) Prior Publication Data

US 2016/0149393 A1    May 26, 2016

(51) Int. Cl.
*H02H 3/08*     (2006.01)
*H02H 3/30*     (2006.01)
*H02H 7/26*     (2006.01)

(52) U.S. Cl.
CPC ............ *H02H 3/305* (2013.01); *H02H 7/262* (2013.01); *H02H 7/263* (2013.01)

(58) Field of Classification Search
CPC ............ H02H 3/08; H02H 3/44; H02H 3/305; H02H 7/262; H02H 7/263
See application file for complete search history.

(56) References Cited

U.S. PATENT DOCUMENTS 2,209,810 A    7/1940   Cordray
6,297,939 B1   10/2001   Bilac et al.
7,542,256 B2    6/2009   Premerlani et al.
7,570,471 B2    8/2009   Weiher et al.
7,576,963 B2    8/2009   Hill et al.
(Continued)

FOREIGN PATENT DOCUMENTS

CA     2186988 A1    4/1997

OTHER PUBLICATIONS

Valdes, Marcelo, et al., "Zone Based Protection For Low Voltage Systems; Zone Selective Interlocking, Bus Differential and the Single Processor Concept," Industrial and Commercial Power Systems Technical Conference, May 4-8, 2008, 10 pages.
(Continued)

*Primary Examiner* — Zeev V Kitov
(74) *Attorney, Agent, or Firm* — General Electric Company

(57) ABSTRACT

An example method of operating a power distribution system including a plurality of source and tie circuit protection devices coupled between at least one source and a protection zone is disclosed. The protection zone includes a distribution bus and a plurality of feeder circuit protection devices coupled between the distribution bus and a plurality of loads. The method includes determining an electric current flowing through each source and tie circuit protection device, determining whether any of the feeder circuit protection devices is outputting a ZSI blocking signal, and controlling operation of the plurality of source and tie circuit protection devices according to an enhanced partial differential protection scheme based on a combination of the determined currents through the source and tie circuit protection devices and the determination of whether any of the feeder circuit protection devices is outputting a ZSI blocking signal.

20 Claims, 3 Drawing Sheets

(56) References Cited

U.S. PATENT DOCUMENTS

| | | | |
|---|---|---|---|
| 8,207,742 B2 | 6/2012 | Sawhney et al. | |
| 2013/0271879 A1* | 10/2013 | Andersen | B63J 3/00 361/20 |
| 2014/0078628 A1 | 3/2014 | Valdes et al. | |

OTHER PUBLICATIONS

Valdes, Marcelo, et al., "Advances in Protective Device Interlocking for Improved Protection and Selectivity," Petroleum and Chemical Industry Technical Conference (PCIC), 2013 Record of Conference Papers Industry Applications Society 60th Annual IEEE, Sep. 23-25, 2013, 10 pages.

* cited by examiner

POWER DISTRIBUTION SYSTEMS AND METHODS OF OPERATING POWER DISTRIBUTION SYSTEMS WITH PARTIAL DIFFERENTIAL PROTECTION

BACKGROUND

The present application relates generally to power distribution systems and, more particularly, to methods of operating power distribution systems using an enhanced partial differential protection scheme.

Known electrical distribution systems include a plurality of switchgear lineups including circuit breakers that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions.

Some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker. However, in power distribution systems that include a plurality of circuit breakers, a typical arrangement uses a hierarchy of circuit breakers. Large circuit breakers (i.e., circuit breakers with a high current rating) are positioned closer to a power source than lower current feeder circuit breakers and feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may detect different amounts of fault current as a result of varying sensor sensitivities and/or tolerances. When the fault occurs, the circuit breaker closest to the fault should operate to stop current from flowing through the circuit breaker. If a circuit breaker higher in the hierarchy trips, multiple circuits or loads may unnecessarily lose service.

To accommodate for the varying tolerances and to ensure that multiple circuit breakers do not unnecessarily trip based on the same fault current, the current thresholds of at least some known circuit breakers are nested with each other to avoid overlapping fault current thresholds. In some other known systems, circuit breakers in a lower tier send coordination or blocking signals to higher tier circuit breakers upon detection of a fault current. The upper tier circuit breakers' operation is coordinated with the operation of the lower tier circuit breaker in response to the blocking signal.

In certain system topologies, circuit breakers known as ties, which connect distribution busses in the same tier of a system with multiple sources supplying multiple busses, cannot detect fault current direction. The trip unit in the tie does not know whether current is flowing through the tie from right to left or left to right. When a fault occurs the tie must send a blocking signal to upper tier devices on all connected sources. This results in the undesirable operation that all source devices are blocked when it would otherwise be desired that at least one of them not be blocked.

A protection scheme called bus differential protection is sometimes implemented, particularly in medium and high voltage systems, to improve upon protection and selective capability of hierarchical systems with one or more intermediary buses. In a system employing a bus differential protection scheme, current signals from all sources and loads must be available at a single circuit protective device. The circuit protection device that receives all of the current signals can identify if there is a fault within the differential zone. This scheme typically requires dedicated sensors at each circuit breaker in the system. The sensors are all coupled to the protective device providing the differential protection. The dedicated sensors generally require a relative high degree of accuracy and sensing quality, causing them to be relatively large. Bus differential protection is difficult to implement in low voltage systems because of the cost, performance issues during high-current faults, current transformer saturation issues, and the size of the additional sensors.

Another protection scheme used in some medium voltage systems is known as partial differential protection. Partial differential protection systems monitor only the source circuits and ties that can contribute fault current, but not the load circuits that may receive the fault current. The current flowing through each circuit breaker connected between a source and a protected bus is measured and provided to a single circuit protection device. The circuit protection device receiving the current data sums the current vectors to determine whether a fault is located outside its protection zone (i.e. on a different bus) or in its protection zone (i.e., on or below its distribution bus). Partial differential protection schemes require fewer current sensors than full bus differential protection schemes, because they do not monitor current through the load/feeder circuit breakers. Partial differential protection is generally cheaper and easier to implement than full bus differential protection. Unlike full bus differential protection schemes, partial differential schemes cannot identify the particular location of a fault within its protection zone (e.g., whether a fault is on the bus or downstream at one or more of the loads connected to the bus). However, partial differential protection schemes can identify when a fault is outside its protection zone, including on the bus itself and connected bus loads.

BRIEF DESCRIPTION

In one aspect, power distribution system connectable to a power source includes a first distribution bus, a second distribution bus, a first circuit protection device, a second circuit protection device, a plurality of feeder circuit protection devices, and a controller coupled to the first and second circuit protection devices, and the plurality of feeder circuit protection devices. The first circuit protection device is coupled between the first distribution bus and the power source. The second circuit protection device is coupled between the first distribution bus and the second distribution bus. Each feeder circuit protection device is coupled to the first distribution bus and configured to protect a portion of the system to which current flows from the first distribution bus. Each feeder circuit protection device is configured to provide a zone selective interlocking (ZSI) blocking signal when a current flowing through the feeder circuit protection device exceeds a predetermined threshold. The controller is configured to control operation of the first circuit protection device and the second circuit protection device according to an enhanced partial differential protection scheme based on currents flowing through the first and second circuit protection devices and a ZSI blocking signal status of each feeder circuit protection device.

Another aspect is a method of operating a power distribution system including a plurality of source circuit protection devices and tie circuit protection devices coupled between at least one source and a protection zone. The protection zone includes a distribution bus and a plurality of feeder circuit protection devices coupled between the distribution bus and a plurality of loads. The method includes determining an electric current flowing through each source circuit protection device and each tie circuit protection device, determining whether any of the feeder circuit protection devices is outputting a zone selective interlocking (ZSI) blocking signal, and controlling operation of the plurality of source circuit protection devices and tie circuit protection devices according to an enhanced partial differential protection scheme based on a combination of the determined currents through the source circuit protection devices and tie circuit protection devices and the determination of whether any of the feeder circuit protection devices is outputting a ZSI blocking signal.

In yet another aspect, a protective relay for a power distribution system including a plurality of source circuit protection devices and tie circuit protection devices coupled between at least one source and a protection zone is described. The protection zone includes a distribution bus and a plurality of feeder circuit protection devices coupled between the distribution bus and a plurality of loads. The protective relay includes a memory device and a processor coupled to the memory device. The protective relay is programmed to determine an electric current flowing through each source circuit protection device and each tie circuit protection device, determine if any of the feeder circuit protection devices is outputting a zone selective interlocking (ZSI) blocking signal, and control operation of the plurality of source circuit protection devices and tie circuit protection devices according to an enhanced partial differential protection scheme based at least in part on a combination of the determined currents through the source circuit protection devices and tie circuit protection devices and the determination of whether any of the feeder circuit protection devices is outputting a ZSI blocking signal.

DETAILED DESCRIPTION

Figure 1:
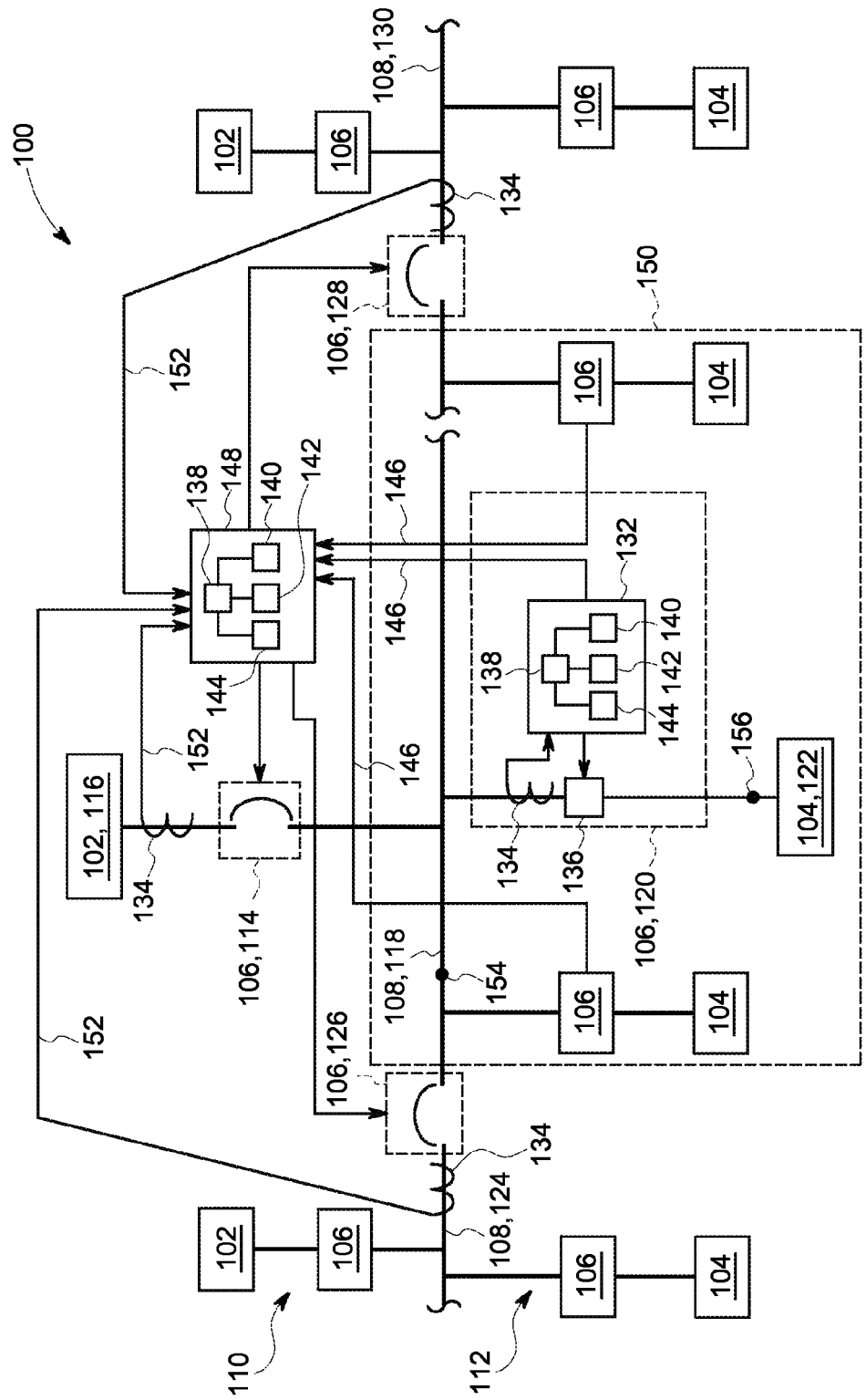
FIG. 1 is a schematic block diagram of an exemplary power distribution system.

Exemplary embodiments of power distribution systems and methods of operating power distribution systems are described herein. The exemplary power distribution systems include source circuit protection devices and ties providing power to a distribution bus, and feeder circuit protection devices delivering power from the distribution bus to loads. The systems include a controller that uses an enhanced partial differential protection scheme to protect a protection zone that includes the distribution bus and the downstream branches with the feeder circuit protection devices. The enhanced partial differential protection scheme sums the electric currents flowing through the source circuit protection devices and the ties to determine if there is an overcurrent condition in the protection zone. When an overcurrent condition is determined to be in the protection zone, the controller determines the likely location of the overcurrent condition and how to operate based on the presence or absence of zone selective interlocking (ZSI) signals output by the feeder circuit protection devices. The exemplary systems provide less expensive and physically smaller protection systems than more complex full differential systems, and may avoid some current transformer saturation issues that arise when a full differential scheme is applied in a low voltage system FIG. 1 is a schematic block diagram of a portion of an exemplary power distribution system 100 including sources 102 providing power to loads 104 via circuit protection devices 106. Electrical power sources 102 may include, for example, one or more generators or other devices that provide electrical current (and resulting electrical power) to loads 104. The electrical current may be transmitted to loads 104 through distribution busses 108. Loads 104 may include, but are not limited to only including, machinery, motors, lighting, and/or other electrical and mechanical equipment of a manufacturing or power generation or distribution facility. Power distribution system 100 is a low voltage distribution system that is rated to operate at alternating current (AC) voltages up to about 600 volts (V). In other embodiments, power distribution system 100 is a medium voltage system rated to operate at AC voltages between about 600 V and about 38 kilovolts (kV). Alternatively, system 100 is rated to operate at any suitable voltage or range of voltages.

In the illustrated embodiment, circuit protection devices 106 are arranged in a hierarchy including a first tier 110 and a second tier 112 to provide different levels of protection and monitoring to power distribution system 100. For example, a first circuit protection device 114 (sometimes referred to as a source circuit protection device) is arranged in first tier 110 to receive current from a first electrical power source 116 and provide current to a first bus 118. A second circuit protection device 120 (sometimes referred to as a feeder circuit protections device) is arranged in the second tier 112 downstream of first circuit protection device 114 and connected to receive current from first bus 118. Second circuit protection device 118 provides current to a first load 122. As used herein, the term "downstream" refers to a direction from electrical power source 102 towards load 104. The term "upstream" refers to a direction opposite the downstream direction, for example, from load 104 towards electrical power source 102. While FIG. 1 illustrates circuit protection devices 106 arranged in two tiers 110 and 112, it should be recognized that any suitable number of circuit protection devices 106 may be arranged in any suitable number of tiers to enable power distribution system 100 to function as described herein. For example, it should be recognized that one or more additional tiers and/or circuit protection devices 106 may be disposed between electrical power source 102 and first tier 110 in some embodiments. Additionally or alternatively, one or more additional tiers and/or circuit protection devices 106 may be disposed between load 104 and second tier 112 circuit protection devices 106 in some embodiments.

The example system 100 includes three distribution busses 108 coupled together by two circuit protection devices 106 referred to as ties. First distribution bus 118 is connected to second distribution bus 124 by a first tie 126 (also referred to as a first tie circuit protection device). A second tie 128 (also referred to as a second tie circuit protection device) connects first distribution bus 118 to a third distribution bus 130. Although three busses are shown in FIG. 1, power system 100 may include any suitable number of busses, including more or fewer than three busses. First tie 126 and second tie 128 are sometimes referred to herein as source circuit protection devices that are connected between a source 102 (via distribution bus 124 or 130) and first distribution bus 118.

In the exemplary embodiment, circuit protection devices 106 are circuit breakers. Alternatively, circuit protection devices 106 may be any other device that enables power distribution system 100 to function as described herein. In an exemplary embodiment, each circuit protection device 106 in second tier 112 includes an integrated trip unit. Details of an example integrated trip unit are shown for second circuit protection device 120, and are omitted from other circuit protection devices 106 for clarity. Second circuit protection device 120 includes a trip unit 132 operatively coupled to a sensor 134 and a trip mechanism 136. Trip unit 132, in an exemplary embodiment, is an electronic trip unit (ETU) that includes a processor 138 coupled to a memory 140, an input device 142, and a display device 144. Trip unit 132 may include, or may be considered to be, a computing device. In other embodiments, trip units 132 may be any other suitable type of trip unit. In some embodiments, one or more of circuit protection devices 106 include a different type of trip unit 132 and/or is a different type of circuit protection device than at least one other of circuit protection devices 106.

Sensor 134, in an exemplary embodiment, is a current sensor, such as a current transformer, a Rogowski coil, a Hall-effect sensor, a fiber optic current sensor, and/or a shunt that measures a current flowing through trip mechanism 136 and/or circuit protection device 106. Alternatively, sensor 134 may include any other sensor that enables power distribution system 100 to function as described herein. Moreover, sensor 134 may be integrated in a circuit protection device 106 or may be separate from an associated circuit protection device 106. Different sensors 134 may be used for different portions of system 100. For example, sensors 134 in first tier 110 may be different than sensors 134 in second tier 112. Each sensor 134 generates a signal representative of the measured or detected current (hereinafter referred to as "current signal") flowing through an associated trip mechanism 136 and/or circuit protection device 106. In addition, each sensor 134 transmits the current signal to processor 138 associated with, or coupled to, trip mechanism 136. Each processor 138 is programmed to activate trip mechanism 136 to interrupt a current provided to a load 104 or an electrical distribution line or buss 108 if the current signal, and/or the current represented by the current signal, exceeds a current threshold. A blocking signal 146 is generated by each trip unit 132 when an amount of current detected by sensor 134 exceeds a blocking threshold (not shown) defined for an associated trip mechanism 136. Blocking signal 146 may be used as part of a zone selective interlocking scheme to inform an upstream protection device 106 that the protection device issuing the blocking signal 146 has detected a fault.

In the example embodiment, trip mechanism 136 is a circuit breaker. An electric signal is provided to trip mechanism 136 to cause the circuit breaker to trip and interrupt the flow of current through trip mechanism 136. In other embodiments, trip mechanism 136 includes, for example, one or more other circuit breaker devices and/or arc containment devices. Exemplary circuit breaker devices include, for example, circuit switches, contact arms, and/or circuit interrupters that interrupt current flowing through the circuit breaker device to a load 104 coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Each processor 138 controls the operation of a circuit protection device 106 and gathers measured operating condition data, such as data representative of a current measurement (also referred to herein as "current data"), from a sensor 134 associated with a trip mechanism 136 coupled to processor 138. Processor 138 stores the current data in a memory 140 coupled to processor 138. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 140 stores program code and instructions, executable by processor 138, to control circuit protection device 106. Memory 140 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 140. Memory 140 may also be, or include, a detachable or removable memory, including, but not limited to, a suitable cartridge, disk, CD ROM, DVD or USB memory.

Input device 142 receives input from, for example, a user, another trip unit 132, a remote computing device, etc. Input device 142 may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, a keypad, a communications port, one or more buttons, and/or an audio input interface. A single component, such as a touch screen, may function as both display device 144 and input device 142. In some embodiments, input device 142 may include a communication interface to receive input from a remote computing device (including from another trip unit 132). Although a single input device 142 is shown, a trip unit 132 may include more than one input device 142 or no input device 142.

Display device 144 visually presents information about circuit protection device 106 and/or trip mechanism 136. Display devices 144 may include a vacuum fluorescent display (VFD), one or more light-emitting diodes (LEDs), liquid crystal displays (LCDs), cathode ray tubes (CRT), plasma displays, and/or any suitable visual output device capable of visually conveying information to a user. For example, processor 138 may activate one or more components of display device 144 to indicate that circuit protection device 106 and/or trip mechanism 136 is active and/or operating normally, is receiving a blocking signal, is transmitting a blocking signal, that a fault or failure has occurred, and/or any other status of trip mechanism 136 and/or circuit protection device 106. In some embodiments, display device 144 presents a graphical user interface (GUI) to a user for interaction between the user and circuit protection device 106. The GUI permits the user, for example, to control circuit protection device 106, monitor operation/status of circuit protection device 106, test operation of circuit protection device 106, and/or modify operational parameters of circuit protection device 106.

System 100 includes a controller 148 for overseeing a protection zone 150. More particularly, controller 148 controls operation of first circuit protection device 114, first tie 126, and second tie 128 using an enhanced partial differential protection scheme. Controller 148 includes processor 138, memory 140, input device 142, and display device 144. In an example embodiment, controller 148 is a protection relay. In some embodiments, controller 148 is a remote computing device. In other embodiments, controller 148 is any analog and/or digital controller suitable for performing as described herein. Controller 148 may be directly connected to one or more components in protection zone and/or may be coupled to one or more components via a network, including the Internet. The communicative coupling may be a wired connection or a wireless connection using any suitable wired and/or wireless communication protocols.

Controller 148 controls operation of first circuit protection device 114, first tie 126, and second tie 128 according to an enhanced partial differential protection scheme. According to the enhanced partial differential protection scheme, controller 148 determines, based on a partial differential protection scheme, if an overcurrent condition is occurring in its protection zone 150. As will be explained in more detail below, controller 148 monitors the electrical currents through first circuit protection device 114, first tie 126, and second tie 128. Controller 148 sums the monitored currents (specifically the current vectors) to determine whether a fault is located inside or outside protection zone 150. As part of the enhanced partial differential protection scheme, if an overcurrent condition is determined to be in protection zone 150, controller 148 determines the likely location of the overcurrent condition and how to operate based on the presence or absence of ZSI blocking signals output by circuit protection devices 106 within the protection zone 150 (sometimes referred to as feeder circuit protection devices).

Specifically, controller 148 is configured, such as via programming stored in memory 140, to protect zone 150 based on the current flowing through first circuit protection device 114, first tie 126, second tie 128, and the presence or absence of blocking signals 146. More particularly, current signals 152 from sensors 134 associated with first circuit protection device 114, first tie 126, and second tie 128 are coupled to controller 148. Controller 148 sums the currents (and more particularly current vectors) represented by the current signals 152 to determine, pursuant to a partial differential protection scheme, whether there is an overcurrent condition (representing a potential fault) in its protection zone 150 or outside its protection zone 150. If the potential fault is outside protection zone 150, the currents will sum to about zero. If the fault is within protection zone 150, the sum of the currents will be a large number that is greater than zero. Accordingly, the summed currents are compared to a threshold value. If the summed currents exceed the threshold value, the overcurrent condition is determined to be in the protection zone. The threshold value is selected to be large enough that normal (i.e., non-fault) operation of system 100 will not produce a sum greater than the threshold.

As part of the enhanced partial differential protection scheme, when controller 148 determines that the summed current indicates an overcurrent condition in protection zone 150 (indicating a potential fault), controller 148 determines whether the potential fault is on first bus 118 (for example at a first location 154) or below first bus 118 (for example at a second location 156) based on the presence or absence of a blocking signal 146 from any of the circuit protection device 106 coupled to first bus 118. If controller 148 receives a blocking signal from one of the circuit protection device 106 in protection zone 150 at about the same time as it receives current signals 152 that indicate a potential fault in protection zone 150, controller 148 determines that the fault is below first bus 118. Controller 148 instructs first circuit protection device 114, first tie 126, and/or second tie 128 not to trip and/or to operate in a slower/restrained mode of operation. Controller 148 may provide the instruction by providing a blocking signal to first circuit protection device 114, first tie 126, and second tie 128. In other embodiments, controller 148 directly controls first circuit protection device 114, first tie 126, and second tie 128 and instructs them not to trip and/or to operate in a restrained mode by not sending a trip signal to first circuit protection device 114, first tie 126, or second tie 128. If controller 148 does not detect a blocking signal from any of the circuit protection device 106 in protection zone 150 at about the same time as detecting a potential fault in protection zone 150, controller 148 instructs first circuit protection device 114, first tie 126, and/or second tie 128 to trip and/or to operate in an unrestrained or accelerated mode of operation. Accordingly, controller 148 is able to provide protection similar to a full bus differential protection scheme, without the needing to receive separate current signals for each of the feeder branches from first bus 118.

Figure 2:
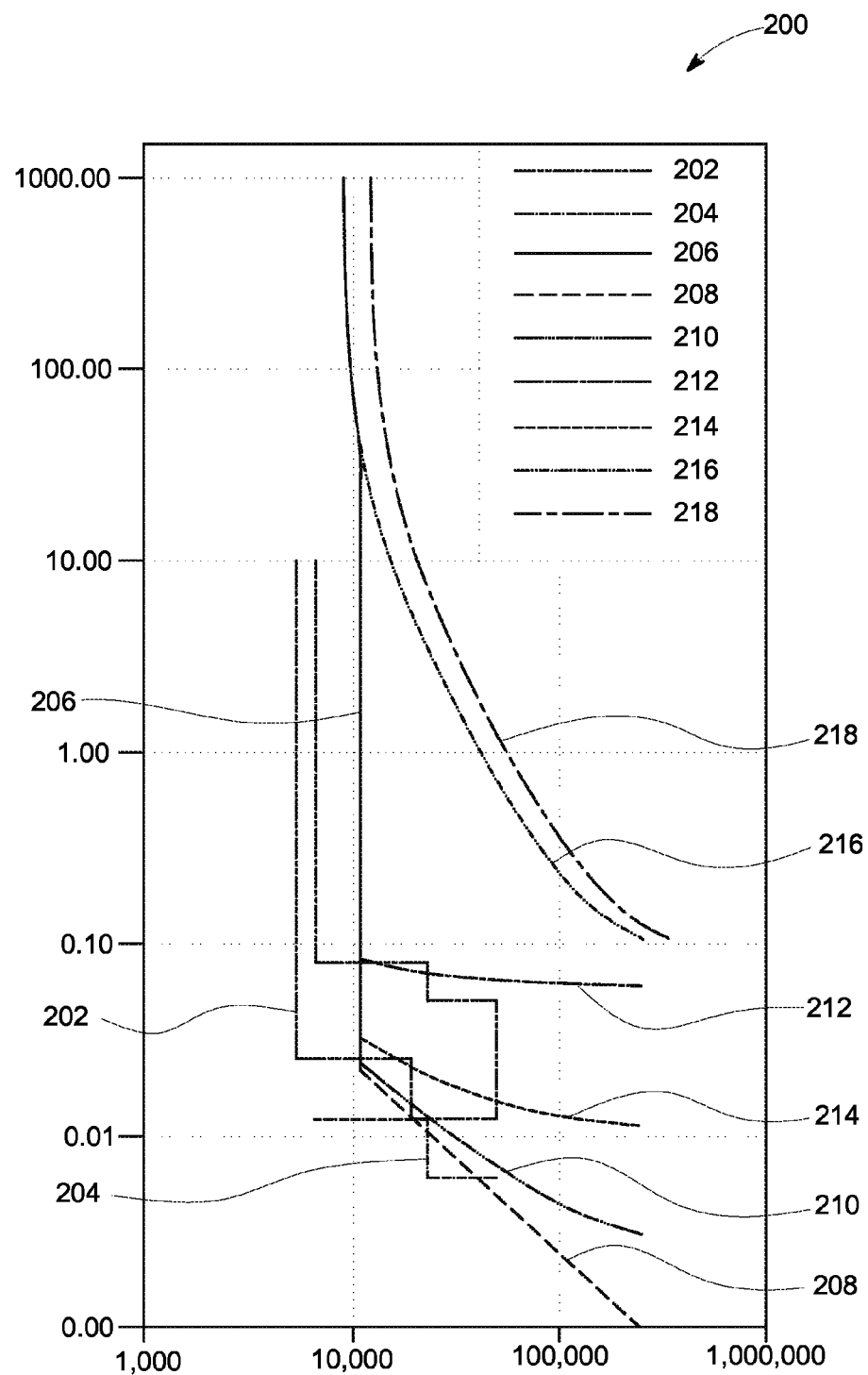
FIG. 2 is a trip current curve (TCC) plot for a portion of the power distribution system shown in FIG. 1.

FIG. 2 is a trip current curve (TCC) plot 200 illustrating the required timing of ZSI blocking signals 146 and signals by controller 148 in a power distribution system, such as system 100 (shown in FIG. 1). Curve 202 is an example curve for second circuit protection device 120. Curve 204 is an example blocking signal for second circuit protection device 120. Curve 206 is the instantaneous partial differential algorithm pickup curve for controller 148. The fault sensing commit curve of controller 148 is curve 208. Curve 210 is the commit, after internal logic, blocking window, and the clearing curve for second circuit protection device 120 is curve 212. Curve 214 is the output contacts curve. Curves 216 and 218 are the primary and secondary curves, respectively.

In order for the system 100 to function as described herein, it is desirable for the downstream circuit protection device's sensing and logic to be fast enough and sensitive enough to provide a blocking signal before controller 148 commits to tripping one of the upstream first circuit protection device 114 and/or ties 126 and 128. When implementing a power distribution system as described herein, therefore, the particular circuit protection devices 106 and controller 148 are selected so that blocking signal curve 204 is below and to the left of commit blocking widow curve 210, as shown in FIG. 2.

Figure 3:
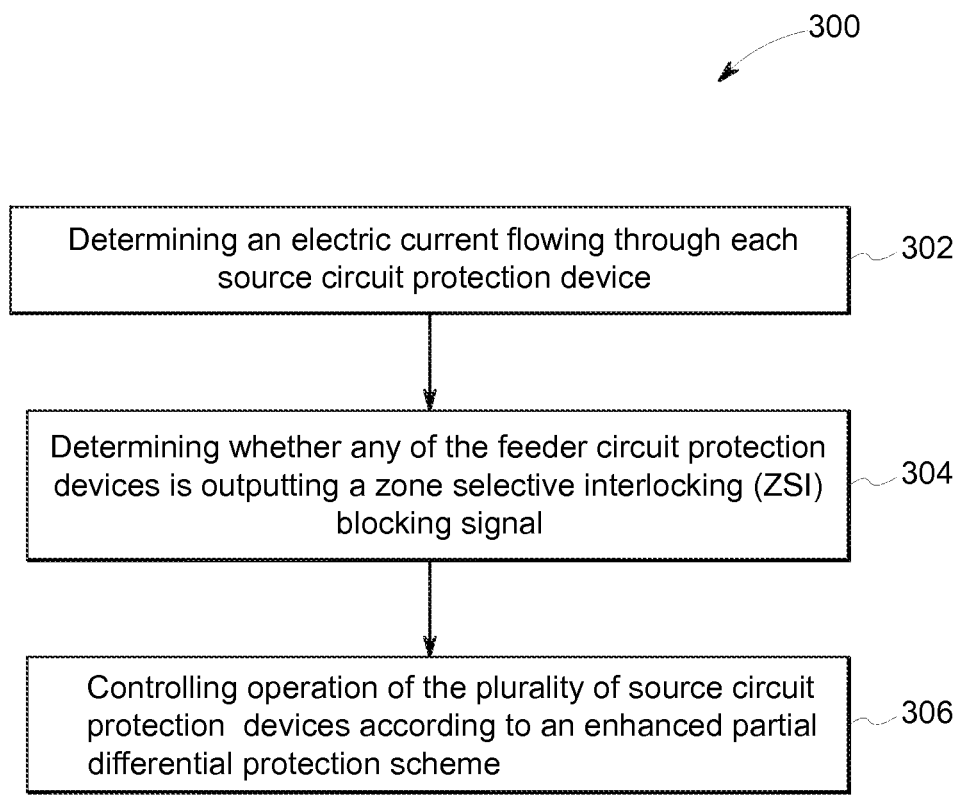
FIG. 3 is a flow diagram of an exemplary method of operating a power distribution system, such as the power distribution system shown in FIG. 1.

FIG. 3 is a flow diagram of an exemplary method 300 of operating a power distribution system, such as power distribution system 100 (shown in FIG. 1). The power distribution system includes a plurality of source circuit protection devices coupled between at least one source and a protection zone. The power distribution system includes a protection zone having a distribution bus and a plurality of feeder circuit protection devices coupled between the distribution bus and a plurality of loads. In an exemplary embodiment, method 200 is executed by monitoring system 168 of one or more of trip units 132. More particularly, method 300 may be executed by processor 138 of controller 148. In an exemplary embodiment, a plurality of computerexecutable instructions is embodied within a computer-readable medium, such as memory. The instructions, when executed by processor 138, cause processor 138 to execute the steps of method 300 and/or to function as described herein.

Method 300 includes determining 302 an electric current flowing through each source circuit protection device and determining 304 whether any of the feeder circuit protection devices is outputting a zone selective interlocking (ZSI) blocking signal. Operation of the plurality of source circuit protection devices is controlled 306 according to an enhanced partial differential protection scheme. The enhanced partial differential protection scheme is based on a combination of the determined currents through the circuit protection devices and the determination of whether any of the feeder circuit protection devices is outputting a ZSI blocking signal.

A technical effect of the methods and systems described herein may include one or more of: (a) determining an electric current flowing through each source circuit protection device and; (b) determining whether any of a plurality of feeder circuit protection devices is outputting a ZSI blocking signal; and (c) controlling operation of a plurality of source circuit protection devices according to an enhanced partial differential protection scheme.

Exemplary embodiments of power distribution systems and methods of operating power distribution systems and/or circuit protection devices are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power distribution system connectable to a power source, said power distribution system comprising:
   a first distribution bus;
   a second distribution bus;
   a first circuit protection device coupled between said first distribution bus and the power source;
   a second circuit protection device coupled between said first distribution bus and said second distribution bus;
   a plurality of feeder circuit protection devices, each feeder circuit protection device coupled between said first distribution bus and a load, each feeder circuit protection device further configured to protect a portion of said system to which current flows from said first distribution bus, wherein each feeder circuit protection device is configured to provide a zone selective interlocking (ZSI) blocking signal when a current flowing through said feeder circuit protection device exceeds a predetermined threshold; and
   a controller coupled to said first and second circuit protection devices and said plurality of feeder circuit protection devices, said controller configured to control operation of said first circuit protection device and said second circuit protection device according to an enhanced partial differential protection scheme based on currents flowing through said first and second circuit protection devices and a ZSI blocking signal status of each feeder circuit protection device, wherein said controller does not control operation of said first and second circuit protection devices based on a current signal received from any of said plurality of feeder circuit protection devices.

2. A power distribution system in accordance with claim 1, wherein said controller comprises a protective relay.

3. A power distribution system in accordance with claim 1 further comprising:
   a first current sensor coupled proximate said first circuit protection device to detect current flowing through said first circuit protection device; and
   a second current sensor coupled proximate said second circuit protection device to detect current flowing through said first circuit protection device, wherein said first and second current sensors are communicatively coupled to said controller.

4. A power distribution system in accordance with claim 3, wherein said first and second current sensors comprise current transformers.

5. A power distribution system in accordance with claim 1, wherein said controller is configured to determine when a fault is located in a protection zone including said first distribution bus and said plurality of feeder circuit protection devices based on a sum of currents flowing through said first and second circuit protection devices.

6. A power distribution system in accordance with claim 5, wherein said controller is configured to determine that a fault located in the protection zone is on said first distribution bus based on an absence of a ZSI blocking signal from any of said plurality of feeder circuit protection devices.

7. A power distribution system in accordance with claim 5, wherein said controller is configured to prevent said first and second circuit protection devices from tripping when it determines a fault in the protection zone and it is receiving a ZSI blocking signal from at least one feeder circuit protection device.

8. A power distribution system in accordance with claim 1, further comprising a third distribution bus and a third circuit protection device coupled between said first distribution bus and said second distribution bus, wherein said controller is configured to control operation of said first, second, and third circuit protection devices according to the enhanced partial differential protection scheme based on currents flowing through said first, second, and third circuit protection devices and the ZSI blocking signal status of each feeder circuit protection device.

9. A power distribution system in accordance with claim 1, wherein each feeder circuit protection device comprises:
a trip mechanism configured to interrupt current flowing through said feeder circuit protection device, and
a trip unit operatively coupled to said trip mechanism, said trip unit configured to:
monitor current flowing through said feeder circuit protection device; and
output a ZSI blocking signal when the monitored current exceeds the ZSI blocking threshold.

10. A method of operating a power distribution system including a plurality of source circuit protection devices and tie circuit protection devices coupled between at least one source and a protection zone, the protection zone including a distribution bus and a plurality of feeder circuit protection devices coupled between the distribution bus and a plurality of loads, said method comprising:
determining an electric current flowing through each source circuit protection device and each tie circuit protection device;
determining whether any of the feeder circuit protection devices is outputting a zone selective interlocking (ZSI) blocking signal; and
controlling operation of the plurality of source circuit protection devices and tie circuit protection devices according to an enhanced partial differential protection scheme based on a combination of the determined currents through the source circuit protection devices and tie circuit protection devices and the determination of whether any of the plurality of feeder circuit protection devices is outputting a ZSI blocking signal, wherein controlling operation of the plurality of source circuit protection devices and tie circuit protection devices is not based on a current signal received from any of the plurality of feeder circuit protection devices.

11. A method in accordance with claim 10, wherein determining an electric current flowing through each source circuit protection device and tie circuit protection device comprises receiving, for each source circuit protection device and tie circuit protection device, a current signal representing an electric current flowing therethrough.

12. A method in accordance with claim 11, further comprising summing the determined electric currents flowing through the source circuit protection devices and tie circuit protection devices, wherein controlling operation of the plurality of source circuit protection devices and tie circuit protection devices according to an enhanced partial differential protection scheme comprises determining, based at least in part on the summed electric currents, when an overcurrent condition exists in the protection zone.

13. A method in accordance with claim 12, wherein controlling operation of the plurality of source circuit protection devices and tie circuit protection devices according to an enhanced partial differential protection scheme comprises preventing the plurality of source circuit protection devices and tie circuit protection devices from tripping when an overcurrent condition is determined to exist in the protection zone and any feeder circuit protection device is determined to be outputting a ZSI blocking signal.

14. A method in accordance with claim 12, wherein controlling operation of the plurality of source circuit protection devices and tie circuit protection devices according to an enhanced partial differential protection scheme comprises permitting at least one circuit protection device of the plurality of source circuit protection devices and tie circuit protections device to trip when an overcurrent condition is determined to exist in the protection zone and none of the plurality of feeder circuit protection devices is determined to be outputting a ZSI blocking signal.

15. A protective relay for a power distribution system including a plurality of source circuit protection devices and tie circuit protection devices coupled between at least one source and a protection zone, the protection zone including a distribution bus and a plurality of feeder circuit protection devices coupled between the distribution bus and a plurality of loads, said protective relay comprising:
a memory device; and
a processor coupled to said memory device, wherein said protective relay is programmed to:
determine an electric current flowing through each source circuit protection device and each tie circuit protection device;
determine if any of the feeder circuit protection devices is outputting a zone selective interlocking (ZSI) blocking signal; and
control operation of the plurality of source circuit protection devices and tie circuit protection devices according to an enhanced partial differential protection scheme based at least in part on a combination of the determined currents through the source circuit protection devices and tie circuit protection devices and the determination of whether any of the feeder circuit protection devices is outputting a ZSI blocking signal, wherein said protective relay does not control operation of the plurality of source circuit protection devices and tie circuit protection devices based on a current signal received from any of the plurality of feeder circuit protection devices.

16. A protective relay in accordance with claim 15, wherein said protective relay is programmed to determine an electric current flowing through each source circuit protection device and each tie circuit protection device based on received current signals representing electric current flowing through each source circuit protection device and each tie circuit protection device.

17. A protective relay in accordance with claim 16, wherein said protective relay is programmed to sum the determined electric currents flowing through the source circuit protection devices and tie circuit protection devices.

18. A protective relay in accordance with claim 17, wherein said protective relay is programmed determine when an overcurrent condition exists in the protection zone based at least in part on the summed electric currents.

19. A protective relay in accordance with claim 18, wherein controlling operation of the plurality of source circuit protection devices and tie circuit protection devices according to an enhanced partial differential protection scheme comprises preventing the plurality of source circuit protection devices and tie circuit protection devices from tripping when an overcurrent condition is determined to exist in the protection zone and any of the feeder circuit protection devices is determined to be outputting a ZSI blocking signal.

20. A protective relay in accordance with claim 18, wherein controlling operation of the plurality of source circuit protection devices according to an enhanced partial differential protection scheme comprises permitting at least one circuit protection device of the plurality of source circuit protection devices and tie circuit protection devices to trip when an overcurrent condition is determined to exist in the protection zone and none of the feeder circuit protection devices is determined to be outputting a ZSI blocking signal.

* * * * *